(12) United States Patent
Li et al.

(10) Patent No.: US 8,947,092 B2
(45) Date of Patent: Feb. 3, 2015

(54) METHODS AND SYSTEMS FOR ESTIMATING FORMATION RESISTIVITY AND POROSITY

(71) Applicant: Halliburton Energy Services, Inc., Houston, TX (US)

(72) Inventors: Jing Li, Houston, TX (US); Michael Bittar, Houston, TX (US); Gary Kainer, Tomball, TX (US); Marvin Rourke, Banstead (GB)

(73) Assignee: Halliburton Energy Services, Inc., Houston, TX (US)

( * ) Notice: Subject to any disclaimer, the term of this patent is extended or adjusted under 35 U.S.C. 154(b) by 34 days.

(21) Appl. No.: 13/949,044

(22) Filed: Jul. 23, 2013

(65) Prior Publication Data

US 2013/0307546 A1 Nov. 21, 2013

Related U.S. Application Data

(63) Continuation of application No. 13/624,047, which is a continuation of application No. PCT/US2011/032877, filed on Apr. 18, 2011, now Pat. No. 8,698,502.

(51) Int. Cl.
*G01V 3/08* (2006.01)
*G06F 1/28* (2006.01)
*G06F 1/32* (2006.01)

(52) U.S. Cl.
CPC .. *G01V 3/08* (2013.01); *G06F 1/28* (2013.01); *G06F 1/3203* (2013.01)
USPC .......................................................... 324/333

(58) Field of Classification Search
USPC ................................................. 324/333, 338
See application file for complete search history.

(56) References Cited

U.S. PATENT DOCUMENTS

| 3,849,721 | A | * | 11/1974 | Calvert | 324/338 |
| 3,944,910 | A | * | 3/1976 | Rau | 324/338 |
| 4,052,662 | A | * | 10/1977 | Rau | 324/338 |
| 4,063,151 | A | * | 12/1977 | Suau et al. | 324/338 |
| 4,077,003 | A | * | 2/1978 | Rau | 324/338 |
| 4,092,583 | A | * | 5/1978 | Coates | 324/338 |
| 4,151,457 | A | * | 4/1979 | Rau | 324/324 |

(Continued)

FOREIGN PATENT DOCUMENTS

| WO | WO03/016826 A2 | | 2/2003 |
| WO | WO 03016826 A2 | * | 2/2003 |

OTHER PUBLICATIONS

International Search Report issued in PCT/US2011/032877 on May 11, 2012.*

*Primary Examiner* — John Fitzgerald
(74) *Attorney, Agent, or Firm* — Benjamin Fite; Baker Botts L.L.P.

(57) ABSTRACT

A method for analyzing a subterranean formation porosity is disclosed. The apparent dielectric constant of the subterranean formation and an apparent resistivity of the subterranean formation are measured. The measured values are used to determine a measured formation loss tangent. The formation water loss tangent can be expressed by the water dielectric constant and the water resistivity. The measured formation loss tangent and the formation water loss tangent are then used to determine at least one of an actual dielectric constant of the subterranean formation water and an actual resistivity of the subterranean formation water. The actual formation porosity may be obtained using the estimated water resistivity and water dielectric constant.

14 Claims, 2 Drawing Sheets

(56) References Cited

U.S. PATENT DOCUMENTS

| | | | |
|---|---|---|---|
| 4,158,165 A * | 6/1979 | Coates | 324/338 |
| 6,755,246 B2 * | 6/2004 | Chen et al. | 166/250.01 |
| 7,353,410 B2 * | 4/2008 | Desai et al. | 713/300 |
| 7,376,514 B2 * | 5/2008 | Habashy et al. | 702/7 |
| 8,698,502 B2 * | 4/2014 | Li et al. | 324/333 |
| 2003/0034777 A1 * | 2/2003 | Chen et al. | 324/303 |
| 2007/0061083 A1 | 3/2007 | Tarek et al. | |
| 2013/0027043 A1 * | 1/2013 | Li et al. | 324/341 |

* cited by examiner

METHODS AND SYSTEMS FOR ESTIMATING FORMATION RESISTIVITY AND POROSITY

CROSS REFERENCE TO RELATED APPLICATION

This application is a continuation of U.S. patent application Ser. No. 13/624,047, filed Sep. 21, 2012, which is a continuation of International Application PCT/US11/032877, filed Apr. 18, 2011, both of which are incorporated herein by reference in their entirety for all purposes.

BACKGROUND

The basic techniques for electromagnetic logging for earth formations are well known. For instance, using a logging tool to determine resistivity (or its inverse, conductivity) of earth formations adjacent a borehole has long been a standard and important technique in the search for and recovery of hydrocarbons. Generally, a transmitter transmits an electromagnetic signal that passes through formation materials around the borehole and induces a signal in one or more receivers. The properties of the signal received, such as its amplitude and/or phase, are influenced by the formation resistivity, enabling resistivity measurements to be made. The measured signal characteristics and/or formation properties calculated therefrom may be recorded as a function of the tool's depth or position in the borehole, yielding a formation log that can be used to analyze the formation.

It is often useful to determine the dielectric constant and resistivity of a downhole formation when performing subterranean operations. A High Frequency Dielectric Tool ("HFDT") may be used to measure the apparent dielectric constant and resistivity of a downhole formation. Typically, the HFDT measurements may be used in conjunction with the Complex Refractive Index Method ("CRIM") to obtain an estimation of the water-filled formation porosity. Specifically, the CRIM equation defines a relationship between the measured (apparent) complex dielectric constant of the formation, the complex dielectric constant of the mud filtrate, the total porosity and the true formation matrix dielectric constant.

However, an implicit assumption when solving the CRIM equation is that the water within the measurement volume of HFDT consists of water from the drilling mud. This assumption is based on two factors. The first factor is the knowledge that water-based-muds ("WBM") invade the near wellbore region displacing some of the original fluids. Secondly, the HFDT has a shallow depth of investigation (typically, of the order of a few inches) which is often subject to the WBM invasion. This implicit assumption may lead to an inaccurate analysis of the subterranean formation. Mud invasion processes are often complex and the water in the HFDT measurement volume may in reality be a variable mixture of mud filtrate and formation water. Moreover, in instances where the near well bore water resistivity and dielectric constant are different from that of the mud filtrate, the CRIM calculated porosity using known mud filtrate properties may disagree with the real formation porosity.

Figure 1:
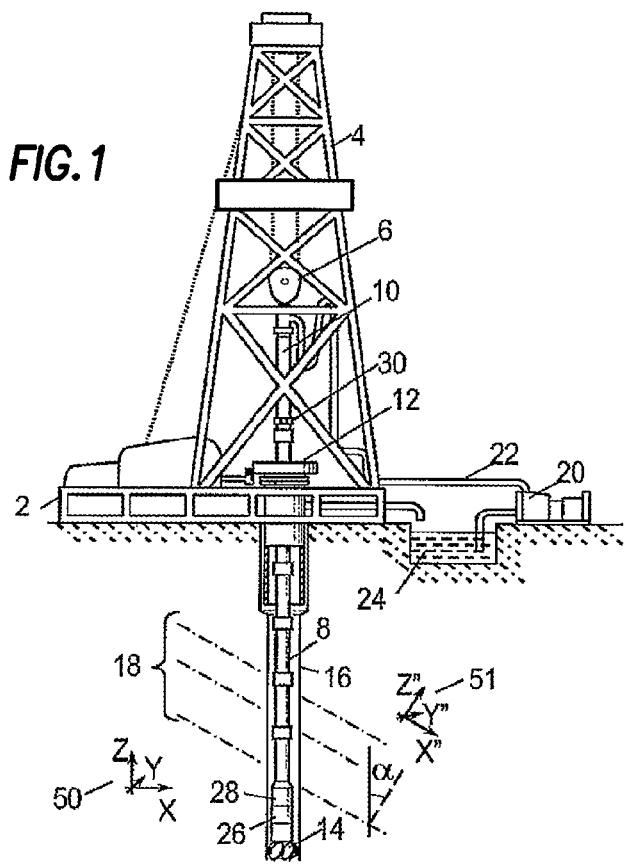
FIG. 1 shows an illustrative logging while drilling environment.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline, measurement-while-drilling ("MWD") and logging-while-drilling ("LWD") operations. "Measurement-while-drilling" is the term generally used for measuring conditions downhole concerning the movement and location of the drilling assembly while drilling continues. "Logging-while-drilling" is the term generally used for similar techniques that concentrate more on formation parameter measurement.

The terms "couple" or "couples," as used herein are intended to mean either an indirect or direct connection. Thus, if a first device couples to a second device, that connection may be through a direct connection, or through an indirect electrical connection via other devices and connections. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

It will be understood that the term "formation water resistivity" relates to the resistivity of water that resides in the formation near wellbore.

The present application discloses a method for estimating the near wellbore apparent formation water resistivity and dielectric constant from the direct HFDT measurements and electromagnetic properties and formation temperature measured by temperature sensors. Once the apparent formation water dielectric and resistivity are known, the formation porosity may be accurately determined by applying the CRIM calculations.

Turning now to FIG. 1, oil well drilling equipment used in an illustrative logging while drilling ("LWD") environment is shown. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

A logging tool 26 may be integrated into the bottom-hole assembly near the bit 14. The logging tool 26 may include a Dielectric measurement sensor. As the bit extends the borehole through the formations, logging tool 26 may collect measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver 30.

Figure 2:
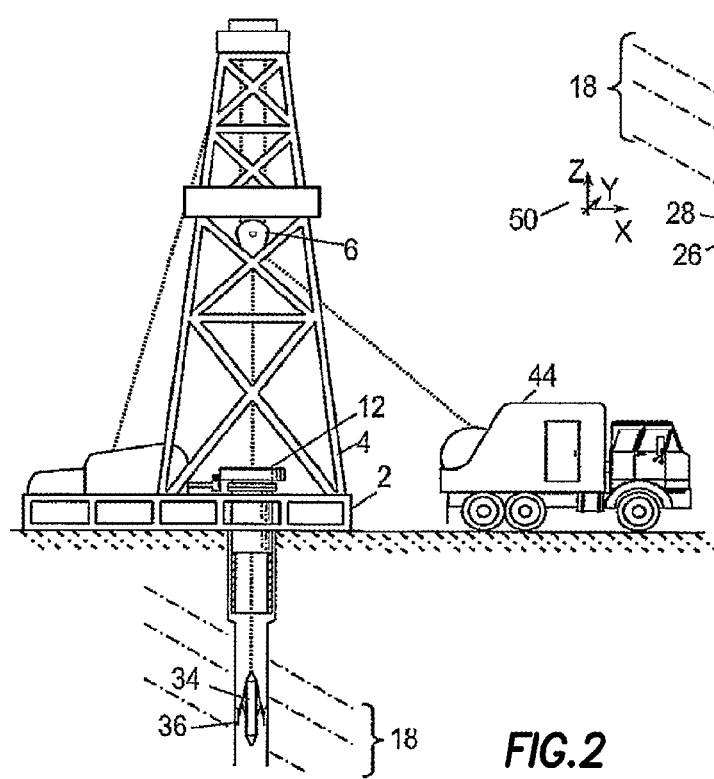
FIG. 2 shows an illustrative wireline logging environment.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable having conductors for transporting power to the tool and telemetry from the tool to the surface. The HFDT portion of the logging tool 34 may be decentralized with caliper arms to ensure that the measurement pad is in contact with the borehole wall.

A logging facility 44 may collect measurements from the logging tool 34, and may include computing facilities for processing and storing the measurements gathered by the logging tool. Like the logging tool 26, logging tool 34 may include a HFDT.

The CRIM equation that may be used in analyzing the subterranean formation characteristics may be presented as:

$$\sqrt{\in_{Meas}} = \sqrt{\in_{Matrix}}(1-\phi) + \sqrt{\in_{MF}}\phi S_{xo} + \sqrt{\in_{HC}}\phi(1-S_{xo}) \quad (1)$$

where $\in_{Meas}, \in_{MF}, \in_{HC}$ are the complex dielectric constants of the measured formation, rock matrix, mud filtrate, and hydrocarbons, respectively; $\phi$ is the formation total porosity; and $S_{xo}$ denotes the water saturation.

When the formation is filled with water, the porosity may be expressed as:

$$\phi_{Water} = \frac{\sqrt{\varepsilon_{Meas}} - \sqrt{\varepsilon_{Matrix}}}{\sqrt{\varepsilon_{MF}} - \sqrt{\varepsilon_{Matrix}}} \quad (2)$$

where the right hand side of Eq. (2) is a complex expression.

Even in its simplified form (Eq. (2)), if the formation water is not from the drilling mud, then the CRIM equation has three unknowns: (1) the porosity; (2) the water resistivity; and (3) the water dielectric constant. One approach proposed by the prior art is to express each complex term in Eq. (1) in terms of its real and imaginary parts and obtain two equations by equating the real and imaginary parts of each side. However, this method may not be well-conditioned and may produce multiple solutions in some circumstances.

Typically, an assumption is applied in Eq. (2) that the water residing in the porosity comes from the drilling mud and its resistivity and dielectric constant can be measured directly from surface measurements. However, that may not always be the case. For instance, in some cases the water is a mixture of mud filtrate and original formation water near wellbore and hence the complex dielectric constant of this water mixture in the near wellbore may not be equal to $\in_{MF}$. In such instances, Eq. (2) may not produce the correct formation porosity. In other cases the near wellbore water can be a mixture of mud filtrate, original formation water and water that has been injected from nearby wells in, for example, a water flooded reservoir.

Figure 3:
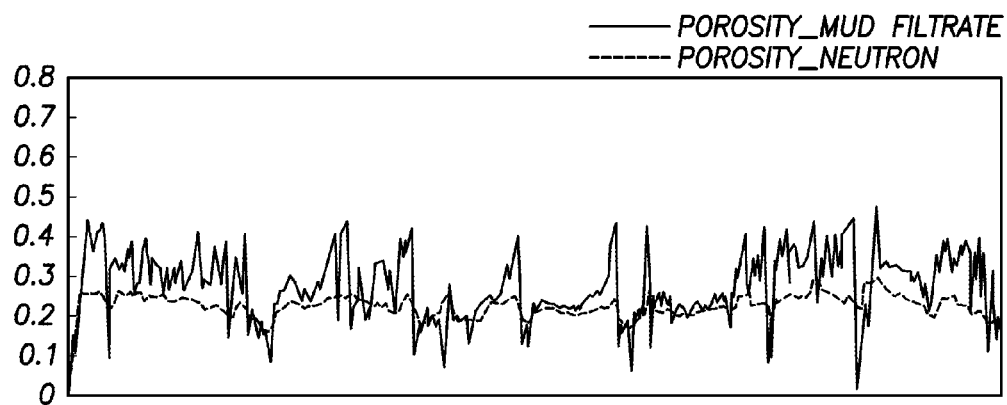
FIG. 3 shows a plot demonstrating the effect of ground water variations on the estimated formation porosity.

FIG. 3 depicts an example of the effect of high salinity formation mixing with mud filtrate on HFDT porosity. The solid line shows the estimated HFDT porosity in accordance with the prior art using mud filtrate dielectric constant and resistivity as obtained from surface measurements. The dotted line shows an independent measurement of porosity that may be obtained by, for example, a neutron tool. As shown in FIG. 3, in this example, the existence of saline formation water causes the HFDT porosity of Eq. (2) to overestimate true porosity.

In accordance with an exemplary embodiment of the present invention, instead of manipulating the CRIM equation, electromagnetic loss tangent may be used to determine formation water resistivity and dielectric constant directly from the tool-measured formation electromagnetic property. The formation typically has a complex relative dielectric constant expressed as:

$$\varepsilon = \varepsilon' + j\left(\frac{1}{\omega\varepsilon_0 R} + \varepsilon''\right) \quad (3)$$

where $\varepsilon'$ represents the lossless permittivity; $\varepsilon''$ is the imaginary amplitude of permittivity attributed to bound charge and relaxation phenomena; and R denotes the formation resistivity. The loss tangent of the formation may be defined as the ratio of the imaginary part over the real part of the complex dielectric constant and may be expressed as:

$$\tan\delta = \frac{1}{\omega\varepsilon_0 R\varepsilon'} + \frac{\varepsilon''}{\varepsilon'} \quad (4)$$

Accordingly, the loss tangent of formation water can be expressed as, $$(\tan\delta)_w = \frac{1}{\omega\varepsilon_0 R_w \varepsilon'_w} + \frac{\varepsilon''_w}{\varepsilon'_w} \quad (5)$$

where the ratio $\varepsilon''_w/\varepsilon'_w$ denotes the water dielectric loss; and $\varepsilon'_w$ is the water dielectric constant. As would be appreciated by those of ordinary skill in the art, with the benefit of this disclosure, determination of the water dielectric loss is well known to those of ordinary skill in the art and will therefore not be discussed in detail herein. A discussion of the water dielectric loss may be found, for example, at http://www.rf-cafe.com/references/electrical/dielectric-constants-strengths.htm, or in Seiichi Sudo, DIELECTRIC RELAXATION TIME AND RELAXATION TIME DISTRIBUTION OF ALCOHOL—WATER MIXTURES, J. Phys. Chem. A, vol. 106, No. 3, pp. 458-464, 2002.

The water dielectric constant, $\varepsilon'_w$, is a function of the water resistivity $R_w$ and the water temperature, T, and can be expressed as:

$$\varepsilon'_w = f(R_w, T) \quad (6)$$

As would be appreciated by those of ordinary skill in the art, with the benefit of this disclosure, the empirical functions of f reflected in Eq. (6) are well known to those of ordinary skill in the art and commonly used in the industry and will therefore not be discussed in detail herein. For instance, a discussion of the empirical functions of f may be found in Stogryn, A., EQUATIONS FOR CALCULATING THE DIELECTRIC CONSTANT OF SALINE WATER, IEEE Trans. on Microwave Theory and Techniques, Vol. 19 No. 8, pp. 733-736, 1971; and Klein, L., and Swift, T., AN IMPROVED MODEL FOR THE DIELECTRIC CONSTANT OF SEA WATER AT MICROWAVE FREQUENCIES, IEEE Trans. on Antennas and Propagation, Vol. AP-25, No. 1, pp. 104-111, 1997.

The formation loss tangent may also be derived from the HFDT measurements as $$(\tan\delta)_{meas\_Form} = \frac{1}{\omega\varepsilon_0 R_{meas\_Form}\varepsilon_{meas\_Form}} \quad (7)$$

$R_{meas\_Form}$, and $\varepsilon_{meas\_Form}$ are the formation apparent resistivity and the dielectric constant measured by HFDT, respectively.

The relaxation loss of dry formation matrices is much smaller than the relaxation loss of water. Accordingly, neglecting the formation matrix's relaxation loss, the measured formation loss tangent should be equal to the formation water loss tangent, and may be represented as:

$$\frac{1}{\omega\varepsilon_0 R_{meas\_Form}\varepsilon_{meas\_Form}} = \frac{1}{\omega\varepsilon_0 R_w \varepsilon'_w} + \frac{\varepsilon''_w}{\varepsilon'_w} \quad (8)$$

In practice, the effect of mud cake, the matrix, and system parameter drifts may cause discrepancies between the measured loss tangent and that of the formation water. One of the methods to compensate the discrepancies lies in introducing an environment factor $\alpha$ to equation (8), such that:

$$\frac{1}{\omega\varepsilon_0 R_{meas\_Form}\varepsilon_{meas\_Form}} = \alpha\left(\frac{1}{\omega\varepsilon_0 R_w \varepsilon'_w} + \frac{\varepsilon''_w}{\varepsilon'_w}\right) \quad (9)$$

As would be appreciated by those of ordinary skill in the art, with the benefit of this disclosure, the environment factor, $\alpha$, may be obtained by calibration.

By solving the two simultaneous Eqs. (6) and (8) (or if the correction factor is used, Eq. (9)), the formation water resistivity and dielectric constant may be obtained. These values may be deemed the "actual" formation water resistivity and the "actual" dielectric constant as they more closely resemble the actual values. Moreover, the corrected formation porosity may be obtained by substituting the derived actual water resistivity and actual dielectric constant into Eq. (2).

Equations (8) or (9) are proposed to estimate water resistivity and dielectric constant from water-saturated formations. In actual downhole logging, a tool may confront non-water-saturated formations or near-zero-porosity formations. In these unfavorable cases, if the stated embodiment above is still applied to estimate formation water resistivity, it could produce a number larger than actual water resistivity because of the lack of saturation water in the formation. Accordingly, in one exemplary embodiment, the methods disclosed herein may be adapted for application to all formation cases. In this embodiment, Equation (6) may be substituted into Equation (9) to derive an equation of $R_w$, as expressed by Equation (10), $$\frac{1}{\omega\varepsilon_0 R_{meas\_Form}\varepsilon_{meas\_Form}} = \alpha\left(\frac{1}{\omega\varepsilon_0 R_w f(R_w, T)} + \frac{\varepsilon'_w}{f(R_w, T)}\right) \quad (10)$$

Eq. (10) may be solved for $R_w$, and the determined value may be compared with a given resistivity limit $R_{Limit}$. The smaller of these two values (i.e., $R_w$ and $R_{Limit}$) may be taken as the true water resistivity and be used to find water dielectric constant from Equation (6), as expressed by Equation (11).

$$\begin{cases} \tilde{R}_w = \min\{R_w, R_{Limit}\} \\ \varepsilon'_w = f(\tilde{R}_w, T) \end{cases} \quad (11)$$

The given limit $R_{limit}$ may be $R_{mf}$ or other values taken according to the formation properties. The corrected formation porosity may then be obtained by substituting the results from Eq. (11) into Eq. (2).

Figure 4:
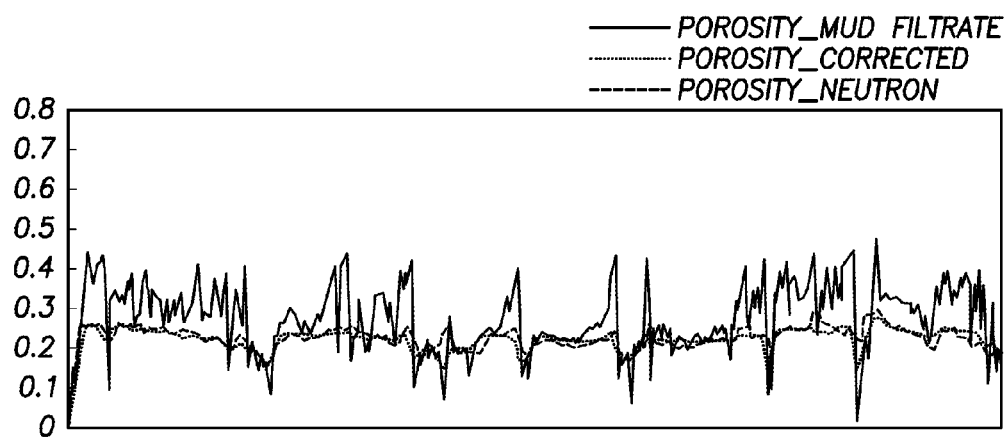
FIG. 4 shows a plot demonstrating the corrected formation porosity determined in accordance with an exemplary embodiment of the present invention.
Figure 5:
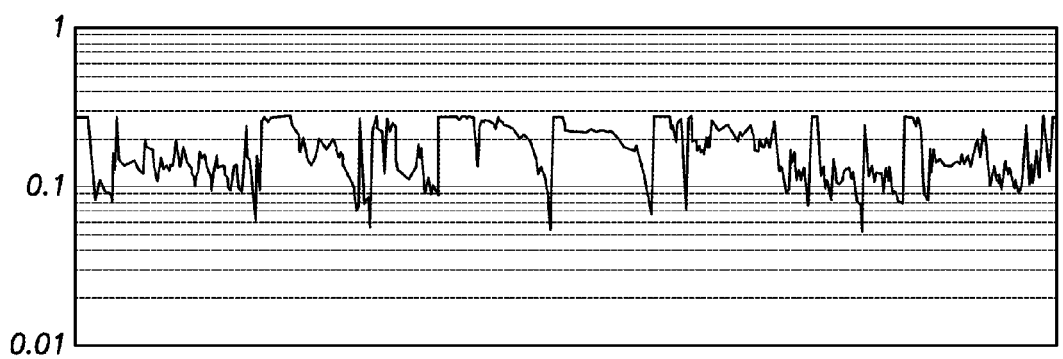
FIG. 5 shows a plot demonstrating the corrected water resistivity determined in accordance with an exemplary embodiment of the present invention.

FIG. 4 shows a corrected HFDT porosity obtained in accordance with an exemplary embodiment of the present invention. As shown in FIG. 4, the corrected HFDT porosity closely follows the independent measurement of porosity that may be obtained by, for example, a neutron tool. FIG. 5 depicts the formation water resistivity derived in accordance with an exemplary embodiment of the present invention. As shown in FIG. 5, the derived formation water resistivity is not constantly equal to the mud filtrate.

As would be appreciated by those of ordinary skill in the art, with the benefit of this disclosure, in one exemplary embodiment, the methods disclosed herein may be performed using an information handling system. The information handling system may be communicatively coupled to a logging tool, such as a HFDT tool, through a wired or wireless communication system. The use of such systems is well known to those of ordinary skill in the art and will not be discussed in detail herein. The information handling system may then process the data received from the logging tool in accordance with embodiments of the present invention. Moreover, all or a portion of the data received from the HFDT tool or calculated by the information handling system may be stored in a computer-readable media.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method for analyzing a subterranean formation comprising:
   measuring an apparent dielectric constant of the subterranean formation and an apparent resistivity of the subterranean formation;
   using the measured apparent dielectric constant of the subterranean formation and the measured apparent resistivity of the subterranean formation to determine a measured formation loss tangent;
   determining a formation water loss tangent;
   determining a water dielectric constant; and
   using the measured formation loss tangent, the formation water loss tangent, and the water dielectric constant to determine at least one of an actual dielectric constant of the subterranean formation and an actual resistivity of the subterranean formation.

2. The method of claim 1, wherein a high frequency dielectric tool measures one of the apparent dielectric constant of the subterranean formation and the apparent resistivity of the subterranean formation.

3. The method of claim 1, wherein determining the formation water loss tangent comprises defining the formation water loss tangent as a function of at least one of water dielectric loss and water dielectric constant.

4. The method of claim 1, wherein determining the water dielectric constant comprises defining the water dielectric constant as a function of at least one of water temperature and water resistivity.

5. The method of claim 1, further comprising introducing an environment factor when determining at least one of the actual dielectric constant of the subterranean formation and the actual resistivity of the subterranean formation.

6. The method of claim 1, wherein an information handling system performs at least one of measuring an apparent dielectric constant of the subterranean formation and an apparent resistivity of the subterranean formation; using the measured apparent dielectric constant of the subterranean formation and the measured apparent resistivity of the subterranean formation to determine a measured formation loss tangent; determining a formation water loss tangent; determining a water dielectric constant; and using the measured formation loss tangent, the formation water loss tangent, and the water dielectric constant to determine at least one of an actual dielectric constant of the subterranean formation and an actual resistivity of the subterranean formation.

7. The method of claim 1, further comprising determining an actual formation porosity.

8. the method of claim 7, wherein the actual formation porosity is determined using a Complex Refractive Index Method.

9. A system for determining formation characteristics comprising:
   a high frequency dielectric tool;
      wherein the high frequency dielectric tool is placed in the formation;
      wherein the high frequency dielectric tool measures an apparent dielectric constant of the formation and an apparent resistivity of the formation; and
   an information handling system communicatively coupled to the high frequency dielectric tool;
      wherein the information handling system receives the apparent dielectric constant of the formation and the apparent resistivity of the formation from the high frequency dielectric tool;
      wherein the information handling system uses the apparent dielectric constant of the formation and the apparent resistivity of the formation to determine a measured formation loss tangent;
      wherein the information handling system determines a formation water loss tangent;
      wherein the information handling system determines a water dielectric constant; and
      wherein the information handling system uses the measured formation loss tangent, the formation water loss tangent, and the water dielectric constant to determine at least one of an actual dielectric constant of the formation and an actual resistivity of the formation.

10. The method of claim 9, wherein determining the formation water loss tangent comprises defining the formation water loss tangent as a function of at least one of water dielectric loss and water dielectric constant.

11. The method of claim 9, wherein determining the water dielectric constant comprises defining the water dielectric constant as a function of at least one of water temperature and water resistivity.

12. The method of claim 9, further comprising introducing an environment factor when determining at least one of the actual dielectric constant of the subterranean formation and the actual resistivity of the subterranean formation.

13. The method of claim 9, further comprising determining an actual formation porosity.

14. the method of claim 13, wherein the actual formation porosity is determined using a Complex Refractive Index Method.

* * * * *